Nov. 25, 1941.   D. H. ROWLAND   2,264,152
METHOD OF FORMING A METALLIC SURFACE ON CERAMIC BODIES
Filed April 27, 1938

Inventor:
Davidge H Rowland,
by Harry E. Dunham
His Attorney.

Patented Nov. 25, 1941

2,264,152

UNITED STATES PATENT OFFICE 2,264,152

METHOD OF FORMING A METALLIC SURFACE ON CERAMIC BODIES

Davidge H. Rowland, Baltimore, Md., assignor, by mesne assignments, to Locke Insulator Corporation, Baltimore, Md., a corporation of Maryland Application April 27, 1938, Serial No. 204,613

4 Claims. (Cl. 91—70.2)

It is desirable often to metalize the surface of a ceramic material, such as porcelain, for example, i. e., to provide on a body or base of such material a surface covering or coating of metal. For example, this is desirable frequently in connection with ceramic insulators for various reasons, such as the distribution of electric stress, elimination of corona, providing for grounding shields on bushings, and the providing of places to which metal parts may be attached by soldering or brazing. Usually, it is desirable to apply metal to only a portion of the surface of the ceramic ware.

In metalizing ceramic surfaces, such as porcelain surfaces, it is important that the metal adhere firmly to the ceramic body which means there must be a good bond between the metal and the body. Otherwise, the metal may peel off, it being prone to do so because of the difference in coefficients of expansion between metals and ceramic materials, such as porcelain.

The object of the present invention is to provide an improved metalized ceramic surface wherein the metal is attached to the ceramic body with a bond of great strength; to provide an improved method for applying metal to ceramic bodies to form a metal covering thereon; and to provide an improved ceramic coating for a ceramic body to which coating the metal is applied.

For a consideration of what I believe to be novel and my invention, attention is directed to the following specification and the claims appended thereto.

The invention is well adapted for use with porcelain insulators and it is this application of my invention which I have elected to specifically illustrate and describe. It is to be understood, however, that this is only by way of example and that the invention may be carried out in connection with porcelain ware or bodies of any desired type, and in connection with ware or bodies formed from ceramics other than porcelain.

Figure 1:
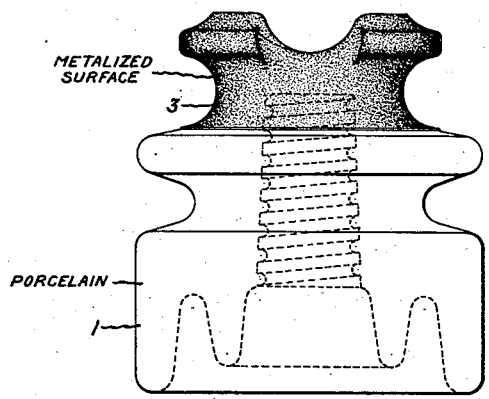
Figure 2:
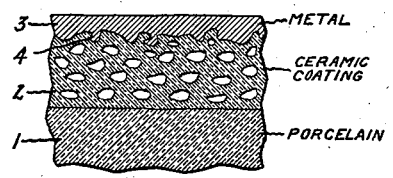

In the drawing, Fig. 1 is a side elevation of an insulator, the upper portion of which is provided with a metallized surface in accordance with my invention, and Fig. 2 is a detail sectional view on a much enlarged scale through a portion of the metalized porcelain surface.

Referring to the drawing, 1 indicates a porcelain insulator, 2 indicates a ceramic coating on the insulator, and 3 indicates metal applied to the ceramic coating. The metal may be copper, aluminum or other metal, as desired. Most frequently, the metal used is copper. In Fig. 2, the thicknesses of the ceramic coating and metal are many times magnified for purposes of illustration. Actually, the thickness of the ceramic coating and metal is of the order of only a few thousandths of an inch, for example, .020".

According to my invention, I provide on the portion of the porcelain surface to which metal is to be applied a ceramic coating of a character such that it provides an outer surface having small crater-like indentations therein, which indentations are to a very considerable extent irregular in shape and undercut. The metal on the surface of the porcelain fills these crater-like indentations and is thus firmly bonded to the porcelain. This is illustrated on a much enlarged scale in Fig. 2 wherein 4 indicates indentations or craters in the surface of the ceramic coating which are irregular in shape and to a very considerable extent undercut, and which are filled with the metal 3.

To provide the portion of the porcelain surface to be metalized with a ceramic coating of the character described, I apply to the ware or body before firing a ceramic mixture having a composition which is highly refractory. This I obtain by using a ceramic mixture or composition having an excess of $Al_2O_3$ which may be supplied in the form of an impalpable calcined aluminum hydrate. By an excess of $Al_2O_3$, I mean that the alumina content is so great compared to the feldspar that at the kiln temperature used for firing the insulator or other device, there is not sufficient feldspar to dissolve it and therefore as the ceramic coating hardens, there are lumps of undissolved alumina distributed throughout the coating. As a result, the ceramic mixture does not form a smooth glossy surface in the kiln but on the contrary provides a surface with a dull finish and one which feels to the touch like the finest grade of emery paper. Under the microscope, such a surface appears to have small crater-like indentations, many of which are undercut.

As a ceramic coating, I have found the following composition or formula satisfactory:

| | Percentage dry weight |
|---|---|
| Ball clay | 10 |
| Calcined aluminum hydrate | 37 |
| Feldspar | 37 |
| $MnO_2$ | 4 |
| $Cr_2O_3$ | 2 |
| $Fe_2O_3$ | 2 |
| Iron chromate | 8 |

To this mixture is added 4% by dry weight of gum arabic and ½% by dry weight of benzoic acid. The composition thus formed is mixed with water sufficient to form a fluid of a density of 1.3. It is to be understood that this formula is given only by way of example. Also, it is to be understood that refractory materials other than alumina, for example, calcined kaolin may be used. In general, a ceramic mixture having a composition comprising alumina or other refractory materials of the order of 45 to 55%, by weight, the remainder of the mixture comprising suitable proportions of fluxes and silicon dioxide is satisfactory, the percentage of silicon dioxide being of the order of twice that of the fluxes.

This mixture for the ceramic coating is applied to the ware by being brushed or sprayed thereon, the latter method being preferable. The application should be just thick enough so that the porcelain will not show through the coating when the ware is fired. The ware is fired at the kiln temperature and for the period in ordinary use for firing ware.

When a porcelain body having a ceramic coating of the character described applied thereto is fired, it comes from the kiln with a dull finish and rough surface as described above. I believe this to be due to the ceramic coating melting and perhaps boiling while being fired in the kiln but which, because of its high viscosity, remains in its vesicular state. I term a ceramic coating of this type a bubble coating because it appears under a microscope that during the firing operation bubbles form in the glaze which at the surface burst out to leave minute irregular cavities or craters in the surface of the coating.

After the porcelain with the bubble coating thereon is removed from the kiln and cooled, the copper or other metal coating may be applied thereto by being sprayed thereon by any suitable process, such as the known Schoop process. When the copper is applied to the surface of the bubble coating, the minute undercut craters are filled with molten metal to which the main mass of metal will adhere tightly, resulting in an excellent bond between the metal and the porcelain surface.

I have found that a metalized surface formed in accordance with my invention is substantially superior to metalized surfaces formed by applying metal to glazed surfaces which have been roughened by sand blasting or by embedding sand in the glaze. I believe this is to be due to the fact that in my improved construction undercut craters are formed in the surface which serve to firmly hold the metal. In addition, my improved construction has the advantage that it may be provided at relatively low cost as compared to sand blasting or embedding sand in a glaze.

What I claim as new and desire to secure by Letters Patent of the United States is:

1. The method of forming a metalized surface on ceramic bodies which comprises applying to the ceramic body before it is fired a ceramic coating composition including therein as one of the refractory materials between 45% and 55% by weight of calcined aluminum hydrate reduced to an impalpable powder, firing the ceramic body and coating at a temperature sufficient to completely vitrify the said body, said temperature being such that the said impalpable refractory material is not entirely dissolved whereby there is provided a ceramic body having a coating the surface of which has minute undercut craterlike indentations, and applying metal in molten form to the surface of such coating.

2. The method of forming a metalized surface on ceramic bodies which comprises applying to the ceramic body prior to firing the same a coating composition in which there is incorporated not less than 37% or more than 55% by weight of pulverized aluminum oxide, firing the coated ceramic body to vitrify the said body whereby there is formed in the surface of said coating a plurality of undercut indentations, and subsequently applying to said surface in spray form a metallic coating.

3. The method of forming a metallic surface on ceramic bodies which comprises applying to an unfired ceramic body a ceramic glaze coating including therein pulverized calcined aluminum hydrate in an amount approximately 45% by weight firing said coated body to completely vitrify the same to thereby cause the said glaze composition to form a highly refractory coating having a dull rough finish surface in which are formed undercut crater-like indentations, and subsequently applying thereto metal in the form of a spray.

4. The method of forming a metallic surface on ceramic bodies which comprises applying to an unfired ceramic body a ceramic glaze coating, said coating including pulverized calcined aluminum hydrate and a flux, the calcined aluminum hydrate comprising approximately from 45% to 55% by weight of said glaze coating whereby when said glaze coating is applied to a ceramic body and the said coated body is fired so as to vitrify the same there is provided a coating having in the surface thereof a plurality of undercut indentations, and subsequently applying thereto metal in the form of a spray.

DAVIDGE H. ROWLAND.